(12) United States Patent
Dam et al.

(10) Patent No.: US 6,550,370 B2
(45) Date of Patent: Apr. 22, 2003

(54) APPARATUS FOR PREPARING BEVERAGES

(75) Inventors: Peter Dam, Hoogeveen (NL); Martin Pieter Van Oeveren, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/023,088

(22) Filed: Dec. 17, 2001

(65) Prior Publication Data

US 2002/0083844 A1 Jul. 4, 2002

(30) Foreign Application Priority Data

Dec. 20, 2000 (EP) .......................................... 00204648

(51) Int. Cl.[7] .............................................. A47J 31/00
(52) U.S. Cl. .............................. 99/280; 99/285; 99/306; 99/307
(58) Field of Search ......................... 99/304, 305, 306, 99/307, 280, 285, 286, 289 R

(56) References Cited

U.S. PATENT DOCUMENTS

| | | | | |
|---|---|---|---|---|
| 3,034,417 A | * | 5/1962 | Bunn | 99/307 X |
| 4,055,114 A | | 10/1977 | Kats et al. | 99/280 |
| 5,778,764 A | * | 7/1998 | Nielsen | 99/285 |
| 6,067,894 A | * | 5/2000 | Eugster | 99/285 |
| 6,305,268 B1 | * | 10/2001 | Schamberg et al. | 99/280 X |

FOREIGN PATENT DOCUMENTS

| | | |
|---|---|---|
| DE | 3408247 C1 | 5/1985 |
| DE | 3705430 A1 | 9/1988 |
| EP | 0091634 | 8/1985 |

* cited by examiner

*Primary Examiner*—Reginald L. Alexander
(74) *Attorney, Agent, or Firm*—Ernestine C. Bartlett

(57) ABSTRACT

An apparatus for preparing beverages, with a filter carrier (5) or filter for retaining a substance to be brought into contact with water. The filter carrier or filter is provided with a filter inlet (51) and a filter outlet (52). At least a lower portion of the filter carrier (5) or the filter is arranged in a filter casing (8) so as to be free from the filter casing (8). The filter casing (8) is provided with a beverage passage (81) which is in communication with the filter outlet (52). A weighing structure (6) carries the filter carrier (5) or the filter and is adapted for providing an indication as to the weight of the filter carrier or the filter and of the substance retained therein. For storing the prepared beverage, a beverage receptacle (9) is provided which has a with an inlet opening (91) communicating with the filter outlet (52) and located downstream thereof when in the operating condition. The apparatus is provided with a drip stop (10) which leaves open the beverage passage (81) of the filter casing (8) when in an open condition and which closes off this beverage passage when in closed condition.

6 Claims, 3 Drawing Sheets

APPARATUS FOR PREPARING BEVERAGES

BACKGROUND OF THE INVENTION

The invention relates to an apparatus for preparing beverages, comprising:
- a filter carrier or filter for accommodating a substance which is to be brought into contact with water, which filter carrier or which filter is provided with a filter inlet and a filter outlet;
- a filter casing in which at least lower portion of said filter carrier or said filter lies free from the filter casing, said filter casing being provided with a beverage passage which is in communication with said filter outlet;
- a weighing structure which supports said filter carrier or said filter, said weighing structure being designed for providing an indication as to the weight of the substance held in said filter carrier or said filter; and
- a beverage receptacle for storing prepared beverage, said beverage receptacle being provided with an inlet opening, which inlet opening in the operational state is in communication with said filter outlet and is situated downstream thereof.

Such an apparatus is known from U.S. Pat. No. 4,055,114. An apparatus for preparing a beverage in the form of coffee is known from this publication, in which the filter carrier can be weighed by means of a suspension mechanism in the form of a lever construction. A float placed in the water reservoir and connected to the lever construction influences the weighing process in dependence on the quantity of water present in the water reservoir. This renders it possible to indicate prior to the preparation of the beverage whether the quantity of substance in the filter is correct for the quantity of water in the water reservoir.

It is a disadvantage of the known apparatus, however, that the prepared coffee during preparation flows from the filter carrier and is spilled when the beverage receptacle is removed from the operational position.

It is known from EP 0 091 634 to counteract this disadvantage through the use of a drip stop. This European patent describes an apparatus for preparing coffee which comprises among other elements a filter carrier provided with an outlet. Said outlet is provided with a closing mechanism which is moved by a lever operated during use in that a coffee jug is placed in the operational position below the filter carrier or is removed from this operational position. This apparatus, however, is not fitted with means for weighing the quantity of substance in the filter carrier.

SUMMARY OF THE INVENTION

It is an object of the invention to provide a possibility of combining the closing off of the beverage supply with a reliable provision of an indication as to the quantity of coffee powder in the filter carrier.

The apparatus according to the invention is for this purpose characterized in that it is provided with a drip stop which releases the beverage passage in an open position and which closes said beverage passage in a closed position.

Since the drip stop can close off the beverage passage, the filter casing can retain prepared beverage flowing through the filter outlet from the filter carrier and thus interrupt the supply of beverage. At the same time, opening or closing of the drip stop does not interfere with the weighing of the filter carrier and the substances held therein because the drip stop closes and releases the beverage passage of the filter casing and accordingly no forces are exerted on the filter carrier by the drip stop.

Particularly advantageous embodiments of the invention are defined in the dependent claims.

BRIEF DESCRIPTION OF THE DRAWINGS

Further aspects, details, and embodiments will be explained in more detail below with reference to an embodiment shown in the drawing, in which.

DESCRIPTION OF THE PREFERRED EMBODIMENTS

Figure 1:
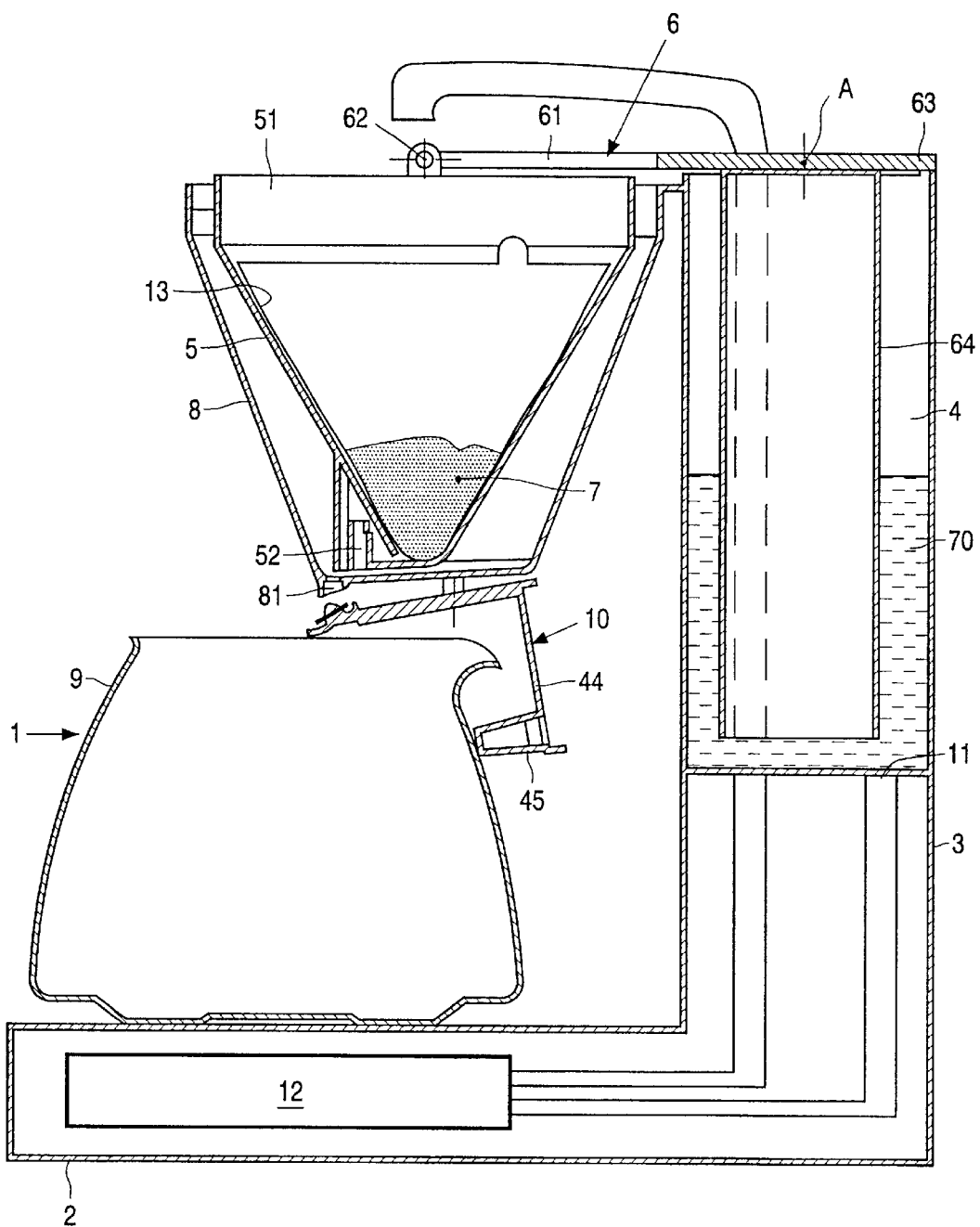
FIG. 1 is a vertical cross-sectional view of a first embodiment of an apparatus according to the invention.

The embodiment shown of the apparatus is a coffee maker 1. The coffee maker has a base 2 and a housing 3 standing on the base 2. A water reservoir 4 is provided in the housing 3. The water reservoir 4 is in communication with a delivery opening above an inlet 51 of a filter carrier 5 via a reservoir outlet 11 and a heating and pumping assembly 12. The filter carrier 5 is suspended from a weighing device 6. A filter 13 and a quantity of coffee powder 7 are present in the filter carrier. The filter carrier 5 is accommodated in a filter casing 8. An outlet 52 of the filter carrier is in communication with a passage 81 of the filter casing 8. A beverage receptacle 9 in the form of a coffee jug with an inlet opening 91 is placed below the filter casing, in an operational position as shown in FIG. 1. The passage 81 may be closed off by means of a drip stop 10 connected to the filter casing 8.

Water is moved from the liquid reservoir 4 through the filter inlet 51 and the pumping assembly 12 to the filter carrier 5. The heating and pumping assembly 12 is constructed as a flow heater 12 which heats the water such that it is brought to the boil. When reaching the boiling point, the water vapor being evolved will expand part of the water, so that heated liquid water is pressed up and is moved through the delivery opening into the filter inlet 51.

The filter carrier 5 is suspended from a weighing device 6. In the example shown, this weighing device 6 is constructed as an arm 61 of which a first end 62 is pivoted to the filter holder 5 and of which a second end 63 rests on the housing 3 with pivoting possibility. The arm 61 is connected to a float 64 present in the water reservoir in a point A lying between the first end 62 and the second end 63.

An upward force is exerted on the float 64 by the water in the water reservoir 4, depending on the quantity of water 70 in the reservoir and acting on the arm 61 in the point A. This upward force keeps the weighing device 6 and the filter carrier 5 suspended therefrom in a high position as long as the moment of forces about the support point at the end 63 exerted by the weight of the weighing device 6 and the filter carrier 5 with the filter 13 and any coffee powder 7 present therein is smaller than the moment of forces about the support point at 63 exerted by the upward force in the point A. When the moment of forces caused by the weights of the weighing device 6, the filter carrier 5, the filter 13, and the coffee powder 7 becomes greater than the opposite moment of forces caused by the upward pressure exerted on the float 64 owing to the addition of coffee powder 7, the arm will move down. Given a suitable attunement of the weighing structure 6, this will form an indication that the quantity of coffee powder 7 in the filter holder 5 is sufficient for preparing coffee from the quantity of water 70 present at that moment in the water reservoir 4.

The point of application A of the float 64 on the arm 61 may be shifted for adapting the beverage to an individual taste, such that for a given quantity of beverage more or less coffee powder is required, and the beverage will be stronger or less strong. The relation between the quantity of coffee powder and the quantity of beverage is not always a linear one; it is possible to adapt the shape of the float so that the upward force has the same relation to the quantity of water as the desirable quantity of coffee powder has to the quantity of beverage.

The filter casing 8 is fixedly connected to the housing 3. The filter casing 8 is provided with a passage 81 in a lower portion. The filter casing 8 is designed such that coffee flowing from the filter carrier 5 through the filter outlet 52 is held in the filter casing 8 if the passage 81 is closed.

It will be obvious to those skilled in the art that many more possibilities exist for providing a balance between the weight of the coffee in the filter and the quantity of water in the reservoir in conformity with an envisaged dosage of the quantity of coffee with respect to the quantity of water. Thus, for example, the weight of the filter carrier, of the filter, and of the coffee present therein may be brought into balance with the weight of the water reservoir and the water present therein in that the water reservoir and the filter holder are coupled to one another and are both jointly suspended with pivoting possibility about a pivot axis.

Figure 2:
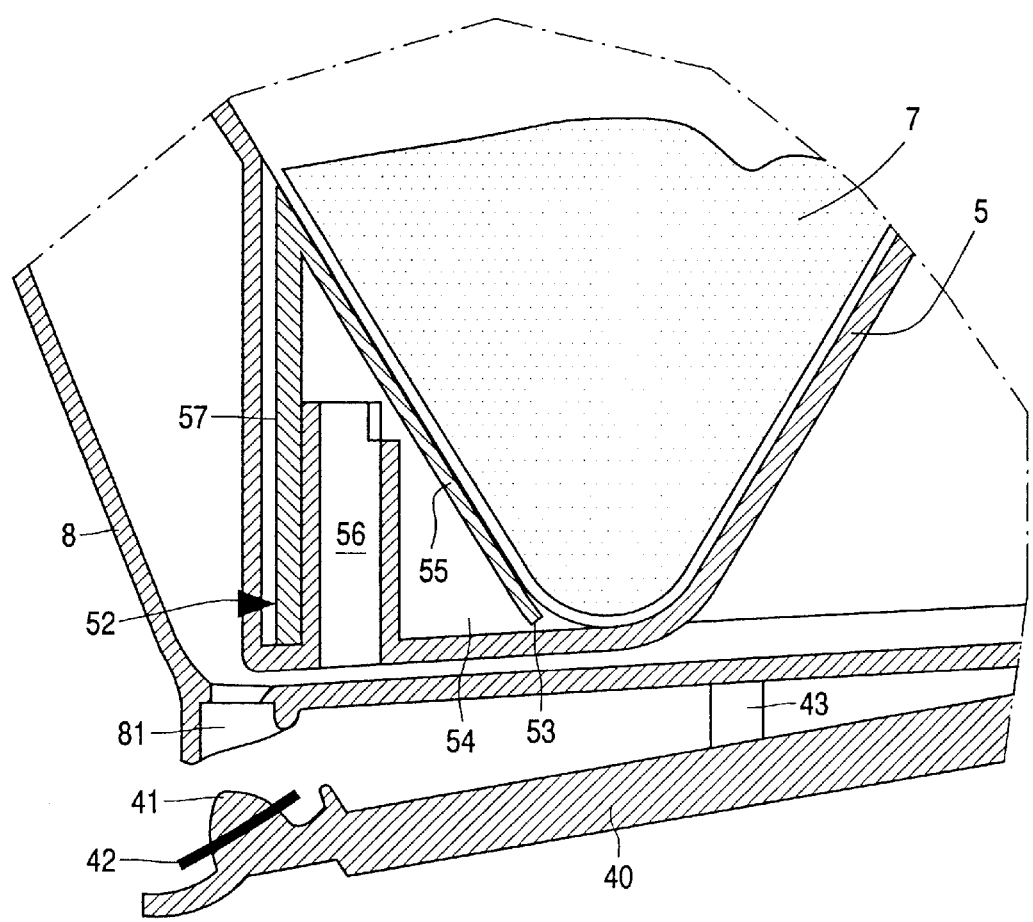
FIG. 2 shows part of the apparatus of FIG. 1 on an enlarged scale.

The drip stop 10 is provided at the bottom of the filter casing 8. As FIG. 2 shows, the drip stop is connected to the filter casing via an arm 40 and a hinge 43. A plug 41 with a sealing ring 42 is arranged at a first end of the arm 40. In the closed position, the plug 41 lies in the passage 81 of the filter casing 8. The passage 81 is closed off thereby. The sealing ring 42 then lies against the passage 81, whereby the passage 81 is closed.

It will be obvious that the invention is not limited to the drip stop mechanism shown in FIG. 2 and that any drip stop mechanism may be used in an apparatus according to the invention.

The drip stop in this example is moved from an open position into a closed position in that the beverage receptacle 9 is removed from its operational position. When the beverage receptacle 9 is brought into the operational position, the drip stop 10 is brought into the open position. The beverage receptacle 9 in that case presses against a projection 45 of an arm 44 which is perpendicular to the arm 40, so that the arm 40 will pivot about the pivot point 43 and the plug 41 and sealing ring 42 will move away from the passage 81.

Since the drip stop 10 is not connected to the filter carrier, the weighing of the quantity of coffee powder is not influenced by the drip stop or by the forces exerted thereon, because the filter carrier 5 is not suspended from the filter casing 8.

The filter outlet 52 in the example shown is constructed as a siphon, as is shown in more detail in FIG. 2. Coffee can flow into the filter casing 8 through a passage 53 and the space 54 formed by walls 55, 57 only if the liquid level in the filter carrier 5 rises to above the free end of the raised tube 52. Coffee present in the channel 56 will then pull the coffee present upstream of that channel but downstream of the passage 53 along to the exterior, such that the filter carrier 5 is substantially completely emptied in that case. The quantity of coffee still leaving the filter 13 after coffee making subsequently is so small that it will not rise to above the raised tube 52 when the filter carrier 5 is removed. Dripping of coffee from the filter carrier 5 after coffee making is thus prevented. This is important for preventing the spilling of coffee when the filter carrier 5 is removed from the coffee maker 1, for example for discarding the coffee grounds and cleaning the filter carrier 5.

Figure 3:
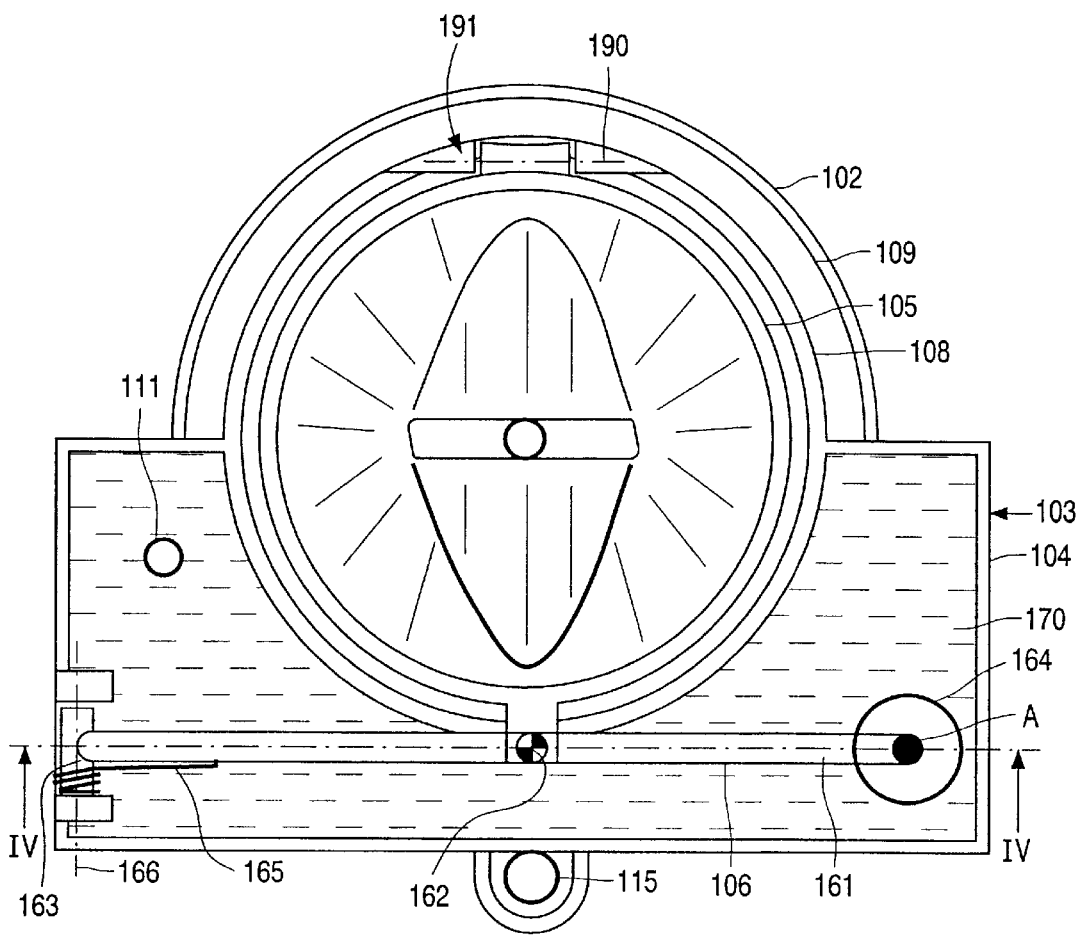
FIG. 3 is a plan view of a second embodiment of an apparatus according to the invention.
Figure 4:
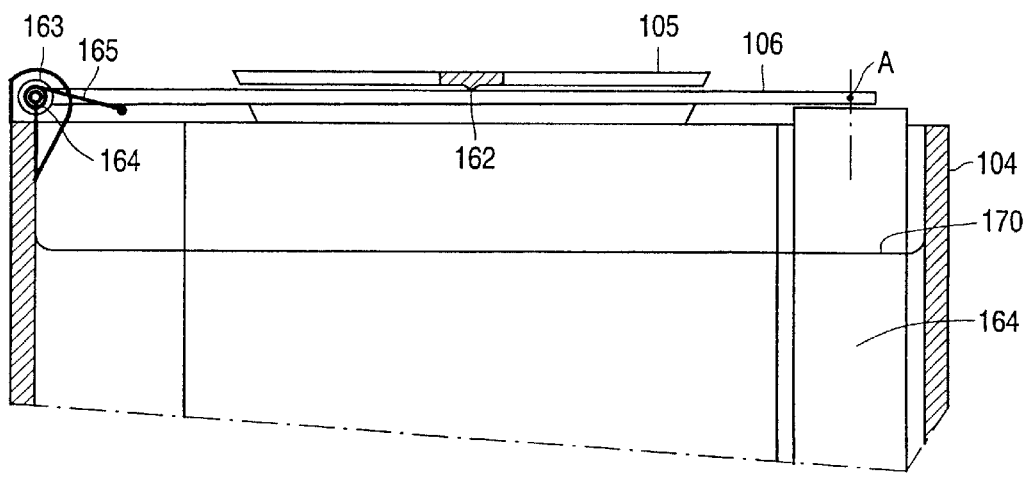
FIG. 4 is a partial lateral cross-sectional view taken on the line IV—IV in FIG. 3.

In the apparatus shown in FIGS. 3 and 4, the water reservoir 104 is constructed as a rectangular container with a semicircular recess in plan view, in which recess the filter carrier 105 is present. The container has an outlet 111 which is in communication with a rise pipe 115 via a heating and pumping element (not shown). Water pushed up through the rise pipe 115 is moved to above the filter carrier 105 through the lid in the operational state and is subsequently sprinkled over the coffee present in the filter carrier 105.

In the operational state, the coffee jug 109 is present below the filter carrier 105 and the filter casing 108, in which at least a lower portion of the filter carrier 105 is situated, and above a base portion 102 of the housing 103. The filter carrier 105 is pivotably suspended at one side thereof about a pivot axis 190 with respect to the filter casing 108, and thus also with respect to the housing 103. At an opposite side, the filter carrier 105 rests on the weighing structure 106 in a point of application 162. This weighing structure 106 has a lever arm 161 which is pivotably suspended about an axis 166 with respect to the housing 103 at an end 163. An opposite end of the lever arm 161 rests on the float 164 in a point of application A. A spring 165 is furthermore provided which presses up the arm 161 about the axis 166. This spring 166 is attuned such that the filter carrier 105 is in equilibrium if an accompanying filter element is present therein, but no coffee, while the water reservoir 104 is empty. After the reservoir 104 has been filled with a quantity of water 170 corresponding to the desired quantity of coffee to be prepared, the equilibrium will be disturbed and the filter carrier will be in a pressed-up position. When the filter is filled with ground coffee beans, the equilibrium will be restored again the moment the grounds in the filter in the filter carrier 105 exert a downward force on the filter carrier 105 such that the latter pushes the float 164 back into the water in the water reservoir 104 again by means of the arm 161 to the extent that the filter carrier 105 returns to its neutral position.

Since the filter carrier 105 is suspended between a pivotable suspension 191 in a fixed position and a suspension 162 bearing on the weighing structure 106, the weighing structure 106 need support only part of the weight of the filter carrier 105 and the coffee present therein. This offers the advantage that the weighing structure 106 may be of a light and compact construction. It is noted that this advantageous effect may also be achieved if no drip stop, whether or not in accordance with the invention as claimed in the present application, is used.

The fact that the filter carrier 105 bears on an arm 161 of the weighing structure 106 in a position 162 situated between a pivotable suspension point 163 of the arm 161 with respect to the housing 103 and a point of application A of forces exerted by the float 164 on the arm 161 is advantageous for limiting the force to be exerted by the float 164 for a given force exerted by the filter carrier 105 on the arm 161 so as to achieve an equilibrium. This means that the float 164 can be of a compact design. This again offers the advantage that the dimensions of the water reservoir 104 may also be reduced, given a certain desired effective capacity of the water reservoir 104. This advantageous effect can also be achieved if no drop stop, whether or not in accordance with the invention as claimed in the present application, is used.

What is claimed is:

1. An apparatus for preparing beverages, comprising:
    a filter carrier (5; 105) or filter for accommodating a substance which is to be brought into contact with water, which filter carrier (5; 105) or which filter is provided with a filter inlet (51) and a filter outlet (52);
    a filter casing (8; 108) in which at least lower portion of said filter carrier (5; 105) or said filter lies free from the filter casing (8; 108), said filter casing (8; 108) being provided with a beverage passage (81) which is in communication with said filter outlet (52);
    a weighing structure (6; 106) which supports said filter carrier (5; 105) or said filter, said weighing structure (6; 106) being designed for providing an indication as to the weight of the substance held in said filter carrier (5; 105) or said filter; and
    a beverage receptacle (9; 109) for storing prepared beverage, said beverage receptacle (9; 109) being provided with an inlet opening (91), which inlet opening (91) in the operational state is in communication with said filter outlet (52) and is situated downstream thereof,
characterized by a drip stop (10) which releases the beverage passage (81) in an open position and which closes said beverage passage (81) in a closed position.

2. An apparatus as claimed in claim 1, wherein the drip stop (10) can be operated by said beverage receptacle (9; 109) for bringing said drip stop (10) from said open position into said closed position in response to the removal of said beverage receptacle (9; 109) from said operational position and for bringing said drip stop (10) from said closed position into said open position, in response to the placement of said beverage receptacle (9; 109) in said operational position.

3. An apparatus as claimed in claim 2, wherein the drip stop (10) comprises an operational member (40, 44, 45) which is displaceable between an operational position and an idle position, which operational member is mechanically coupled to a closing device (41, 42) of the drip stop (10) such that the closing device (41, 42) releases the beverage passage (81) when the operational member (40, 44, 45) is in the operational position and closes the beverage passage (81) when the operational member (40, 44, 45) is in the idle position, while the beverage receptacle (9; 109) in its operational position keeps the operational member (40, 44, 45) in the operational position, and the operational member (40, 44, 45) is in the idle position when the beverage receptacle (9; 109) is not in its operational position.

4. An apparatus as claimed in claim 1, further comprising:
    a water reservoir (4; 104) upstream of and in communication with said filter carrier (5; 105) or said filter,
    means (12) for heating water from said water reservoir (4; 104) and for supplying water from said water reservoir (4; 104) to said filter carrier (5; 105) or said filter.

5. An apparatus as claimed in claim 1, wherein said filter outlet (52) is constructed as a siphon (52, 53–56) provided at an inside of said filter carrier (5; 105).

6. An apparatus as claimed in claim 5, wherein said siphon (52) is constructed as a vertical pipe present in said filter carrier (5; 105) and a cap (55, 57) situated over a free end of said pipe with a local inlet (53) at a distance below the free end of said pipe.

* * * * *